United States Patent [19]

Takayama et al.

[11] Patent Number: 5,548,815
[45] Date of Patent: Aug. 20, 1996

[54] INDUCTIVE RADIO COMMUNICATION SYSTEM

[75] Inventors: Masato Takayama, Kanagawa; Yasufumi Amari, Tokyo, both of Japan

[73] Assignees: Sony Corporation; Secom Corporation Limited, both of Tokyo, Japan

[21] Appl. No.: 379,952

[22] Filed: Jan. 27, 1995

[30] Foreign Application Priority Data

Jan. 28, 1994 [JP] Japan .................................... 6-026106

[51] Int. Cl.⁶ .................................................... H04B 5/02
[52] U.S. Cl. ............................. 455/41; 455/274; 246/194; 343/711
[58] Field of Search ........................... 455/41, 40, 272, 455/273, 274, 275, 276.1; 375/275; 343/711, 867; 340/933, 941; 246/63 R, 63 C, 192 R, 194, 193, 202, 187 B, 8; 191/10

[56] References Cited

U.S. PATENT DOCUMENTS

| | | | |
|---|---|---|---|
| 3,527,897 | 9/1970 | Masao et al. | 246/8 |
| 3,701,102 | 10/1972 | Berman et al. | 340/933 |
| 5,431,264 | 7/1995 | Tseng et al. | 191/10 |

FOREIGN PATENT DOCUMENTS

| | | | |
|---|---|---|---|
| 63-0072414 | 6/1978 | Japan | 455/41 |
| 58-92153 | 6/1983 | Japan | 375/275 |
| 60-0072334 | 4/1985 | Japan | 455/41 |

Primary Examiner—Reinhard J. Eisenzopf
Assistant Examiner—Nguyen Vo
Attorney, Agent, or Firm—Hill, Steadman & Simpson

[57] ABSTRACT

An inductive radio communication system in which two sets of parallel lines are provided so as to be separated from each other at a predetermined distance therebetween along the track of a mobile unit, and a loop antenna having a double loop structure and attached on the mobile unit is disposed between the two sets of parallel lines. The loop antenna is arranged such that currents flow in the respective loops in opposite directions to each other at a certain instant. Levels of signals transmitted from the loop antenna to the parallel lines through electromagnetic coupling are added to each other when the signal levels are applied to the primary side of a level converting transformer, and then the output of the transformer is transmitted to a receiver of the ground station side, whereby the undesirable noises radiated to the outside is reduced and the coupling level between the antenna and the parallel lines through electromagnetic coupling is improved.

4 Claims, 3 Drawing Sheets

INDUCTIVE RADIO COMMUNICATION SYSTEM

BACKGROUND OF THE INVENTION

1. Field of the Invention

The present invention generally relates to an inductive radio communication system, and particularly to an inductive radio communication system for transmitting and receiving a signal, such as audio data, video data, or the like, between a mobile body or unit and a ground station.

2. Description of the Related Art

Such an inductive radio communication system of the type described above has heretofore been known to have the following configuration. As shown in FIG. 1 of the accompanying drawings, parallel lines 2 are laid down so as to serve as an inductive radio cable along a track of a mobile unit 1. An antenna 3 attached on the mobile unit 1 is arranged in the vicinity of the parallel lines 2. A signal to be transmitted from the mobile unit 1 to a ground station is modulated by a transmitter 4, then the modulated signal is supplied to the antenna 3 and transmitted from the antenna 3 to the parallel lines 2 due to electromagnetic coupling therebetween. The signal transmitted to the parallel lines 2 is then supplied through a transformer 5 to a receiver 6 of the ground station side and then demodulated in the receiver 6. Thus, the demodulated signal is output as a reception signal from the receiver 6. FIG. 2 shows an outer face of an example of the parallel lines 2.

In such an inductive radio communication system as described above, the antenna 3 on the mobile unit 1 is moved in a manner that it opposes to the parallel lines 2 on the ground. When the mobile unit 1 is moved, since the antenna 3 is displaced in the upper and lower direction due to vibrations of the mobile unit 1, the distance between the antenna 3 and the parallel lines 2 is changed. There is then the problem that, when the antenna 3 is moved in the direction that the distance becomes large, the coupling level of the electromagnetic coupling is lowered.

In order to solve the above-mentioned problem, there is proposed a method that the output power of the transmitter side is increased to a certain extent taking the fluctuation of the above-mentioned distance into consideration, or an antenna having a good radiation efficiency is used. Such a method, however, is not preferable because undesired radiation noise radiated to the outside increases accordingly.

SUMMARY OF THE INVENTION

It is therefore an object of the present invention to provide an inductive radio communication system in which the coupling level due to electromagnetic coupling between an antenna and parallel lines can be suppressed from being lowered without increasing undesired radiation noise radiated to the outside.

In order to achieve the above-mentioned object, according to the present invention, there is provided an inductive radio communication system which comprises at least two sets of parallel lines separated from each other by a predetermined distance and installed along the track of the mobile unit, an antenna attached on the mobile unit and disposed between the parallel lines, and a signal transmission means for transmitting a signal between the ground station and the parallel lines.

In this inductive radio communication system, preferably, the antenna is constituted by a loop antenna.

In this inductive radio communication system, preferably, the loop antenna has a loop length sufficiently shorter than a signal wave length and has a double loop structure so that currents flow in respective loops in opposite directions to each other at a certain instant.

In the inductive radio communication system, preferably, the signal transmission means transmits a signal from the parallel lines to the ground station in a manner that levels of signals supplied from the parallel lines are added to each other.

In the inductive radio communication system according to the present invention, since the loop antenna attached on the mobile unit is located between the two sets of parallel lines, even if the loop antenna goes away from one set of parallel lines when the loop antenna swings up or down due to vibrations of the mobile unit as the mobile unit moves, the loop antenna approaches to the other set of parallel lines.

Accordingly, even if the coupling level due to electromagnetic coupling is lowered at the one set of parallel line side, the coupling level is increased at the other set of parallel line side. Consequently, the coupling level due to vibrations of the mobile unit can be suppressed from being lowered.

Further, in the inductive radio communication system according to the present invention, since the loop length of the loop antenna is sufficiently shorter than the signal wave length, the loop antenna has such characteristics that the magnetic field is strong in the vicinity of the antenna while the magnetic field becomes weak suddenly when it comes away from the antenna. Further, since currents flow in the respective loops of the loop antenna in the opposite direction to each other at a certain instant, currents flow in the two sets of parallel lines also in the opposite directions at a certain instant.

Accordingly, when viewed from the outside of the two sets of parallel lines, the magnetic fields are generated around the two sets of parallel lines due to the currents flowing in the respective lines in such direction that the magnetic fields cancel each other. Accordingly, the magnetic filed radiated to the outside is weakened as compared with the case of using only one set of parallel lines. Further, since the magnetic filed thus generated serve to cancel the changes of the magnetic field applied from the outside, the inductive radio communication system is difficult to be influenced by extraneous noise.

Further, in the inductive radio communication system according to the present invention, the respective signal levels transmitted from the loop antenna to the two sets of parallel lines through electromagnetic coupling are added to each other, for example, when a signal is transmitted from the mobile unit side to the ground station side. Accordingly, a large signal level can be obtained from the parallel line side as compared with the case of using only one set of parallel lines.

DETAILED DESCRIPTION OF THE PREFERRED EMBODIMENT

An inductive radio communication system according to an embodiment of the present invention will described below with reference to the drawings.

Figure 1:
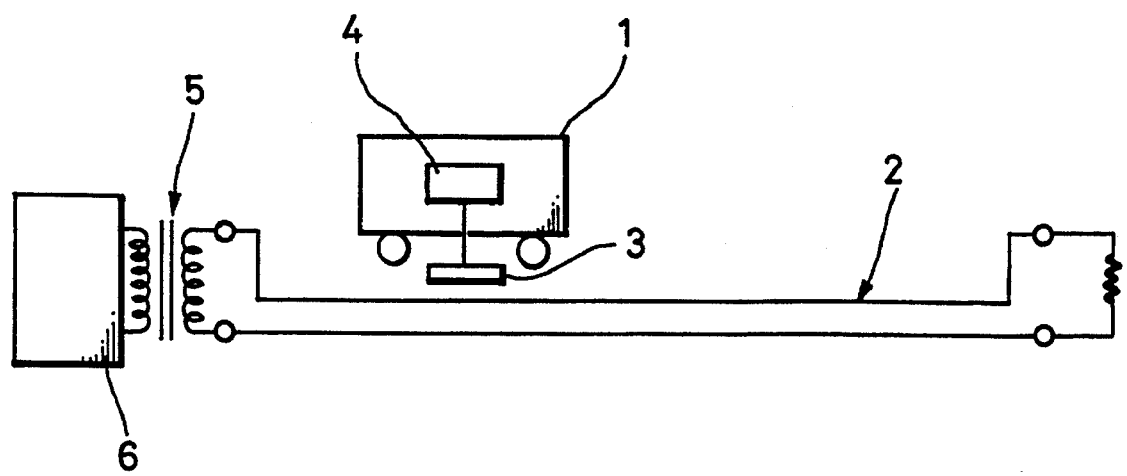
FIG. 1 is a schematic diagram showing an inductive radio communication system according to the related art.
Figure 2:
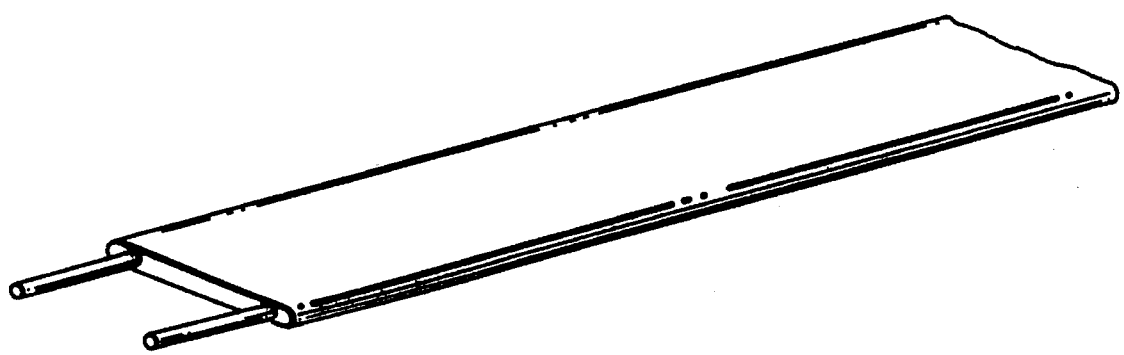
FIG. 2 is a perspective view showing an outer face of an example of parallel lines of the related art.
Figure 3:
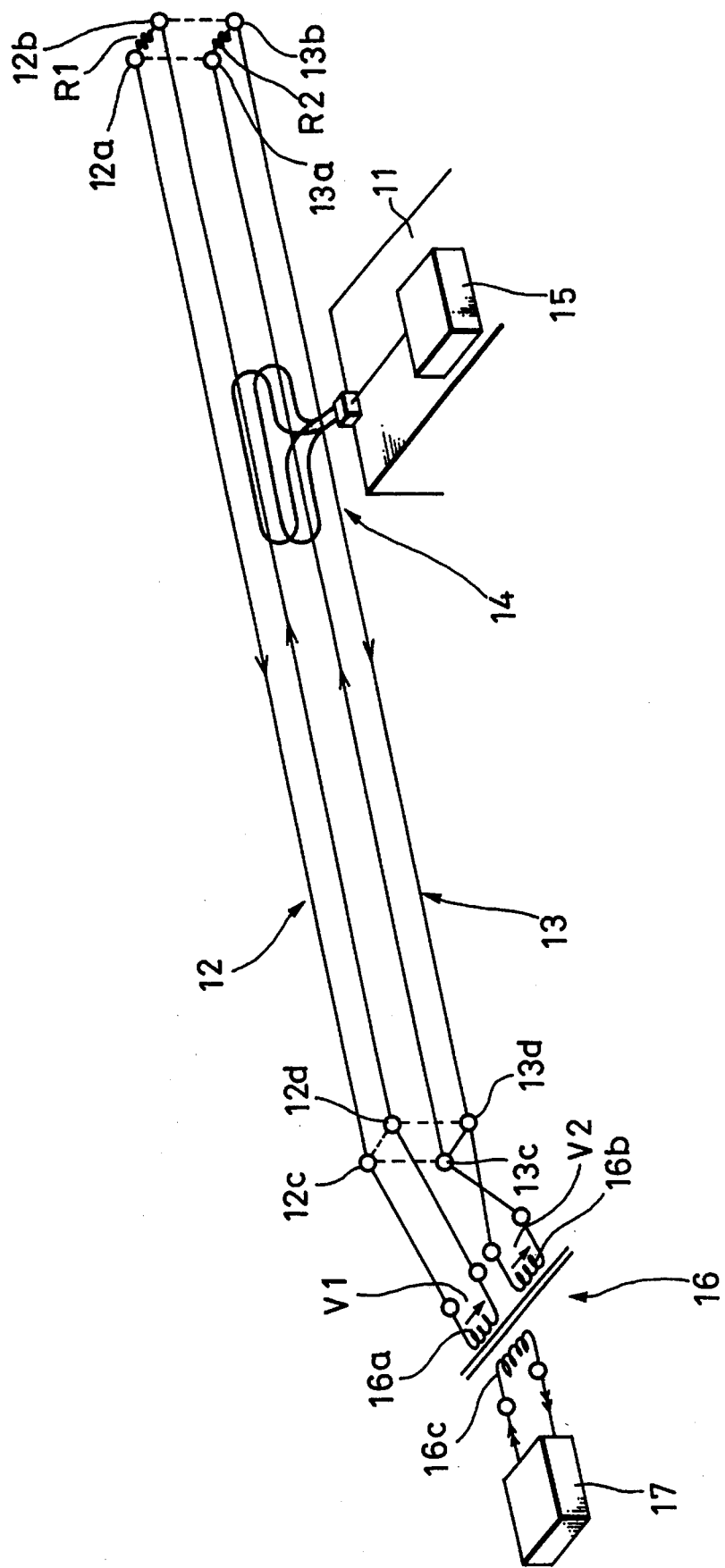
FIG. 3 is a diagram showing an inductive radio communication system according to an embodiment of the present invention.

FIG. 3 is a schematic diagram showing the inductive radio communication system according to an embodiment of the present invention.

Referring to FIG. 3, two sets of parallel lines 12 and 13 are installed so as to serve as inductive radio cables along a track of a mobile unit 11 such that the two sets are spaced with a predetermined distance therebetween.

A loop antenna 14 is attached on the mobile unit 11. The loop antenna 14 is arranged such that it is inserted into substantially a middle position between the two sets of parallel lines 12 and 13.

While the mobile unit 11 is moved, the loop antenna 14 moves along the parallel lines 12 and 13 in a manner that the loop antenna 14 is kept to be disposed between the two sets of parallel lines 12 and 13. The mobile unit 11 is designed so as to have positioning capability to an extent to prevent the loop antenna 14 from coming into contact with the parallel lines 12 and 13 when the mobile unit 11 is moved.

Figure 4:
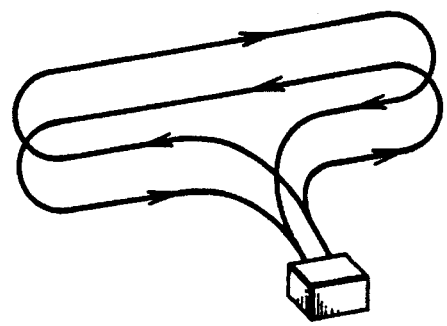
FIG. 4 is a perspective view showing an example of the loop antenna suitable for use in the inductive radio communication system according to the present invention.

As shown in FIG. 4, the loop antenna 14 has the loop length sufficiently shorter than the signal wave length and has a double loop structure so that the respective directions of currents flowing at a certain instant in the upper and lower loops are made opposite to each other. The input terminal of the loop antenna 14 is connected to the output terminal of a transmitter 15 mounted on the mobile unit 11.

A resistor R1 is connected between terminals 12a and 12b provided at one ends of the parallel lines 12, and a resistor R2 is connected between terminals 13a and 13b provided at one ends of the parallel lines 13. Terminals 12c and 12d provided at the other ends of the parallel lines 12 are directly connected to both ends of one primary winding 16a of a level converting transformer 16, respectively, while terminals 13c and 13d provided at the other ends of the parallel lines 13 are connected through two lines to the respective both ends of another primary winding 16b of the level converting transformer 16 in a cross fashion.

The level converting transformer 16 serves as a signal transmission means for converting levels of signals transmitted through the parallel lines 12 and 13 and for transmitting the level-converted signals to the ground station side. An output signal induced across both ends of a secondary winding 16c of the level converting transformer 16 is supplied to a receiver 17 of the ground station side.

Operation of the thus arranged inductive radio communication system will be described below.

The mobile unit 11 is driven by a driving source (not shown) to move along a predetermined track (a linear track in this embodiment). While the mobile unit 11 is moved, the loop antenna 14 is moved in the left-hand side or right-hand side direction in the sheet of drawing in a manner that the loop antenna 14 is kept to be disposed at substantially a middle position between the two sets of parallel lines 12 and 13.

While the mobile unit 11 is moved, a signal to be transmitted from the mobile unit 11 side to the ground station side is modulated in the transmitter 15 and the modulated signal is supplied to the loop antenna 14.

Since the loop length of the loop antenna 14 is sufficiently shorter than the signal wave length, the distribution of the current flowing through the loop becomes substantially constant. Assuming that currents flow at a certain instant through the upper and lower loops of the loop antenna 14 respectively in the directions shown in FIG. 4, then currents flow in the two sets of parallel lines 12 and 13 respectively in the direction shown in FIG. 3 due to the electromagnetic coupling between the loop antenna and the two sets of parallel lines.

Figure 5:
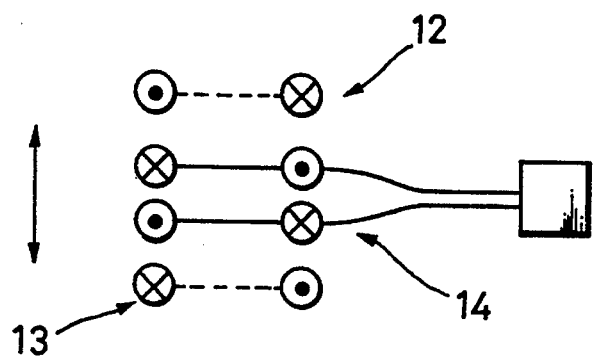
FIG. 5 is a cross-sectional view of the two sets of parallel lines and the loop antenna used in the present invention and showing the direction of a current flowing therethrough.

FIG. 5 is a cross-sectional view showing the directions of the currents flowing in the two sets of parallel lines 12 and 13 and the loop antenna 14. In the sheet of drawing, the directions of currents at a certain instant are represented by solid circles and crosses.

In FIG. 5, a change of current in the direction represented by the cross in the parallel lines 12 and 13 is induced by a change of current in the direction represented by the solid circle in the loop antenna 14, while a change of current in the direction represented by the solid circle in the parallel lines 12 and 13 is induced by a change of current in the direction represented by the cross in the loop antenna 14. The direction of currents in this case corresponds to the direction of arrows in FIGS. 3 and 4.

The signal transmitted from the loop antenna 14 to the parallel lines 12 and 13 due to the electromagnetic coupling is applied as signal levels V1 and V2 respectively to the primary windings 16a and 16b of the level converting transformer 16. The signals levels V1 and V2 are substantially equal to each other when the distance between the loop antenna 14 and the parallel lines 12 is equal to the distance between the loop antenna 14 and the parallel lines 13.

Since the terminals 13c and 13d of the parallel lines 13 are connected to the both ends of the primary winding 16b in the cross fashion, the respective signal levels V1 and V2 of the parallel lines 12 and 13 are added to each other when they are applied to the primary side of the level converting transformer 16.

Accordingly, by using such two sets of parallel lines 12 and 13, it is possible to obtain a signal level (V1+V2) which is large as twice as that used in the case of using only one set of parallel lines. This signal level (V1+ V2) is converted in level by the level converting transformer 16 in accordance with the turn ratio between the primary and secondary windings thereof and then demodulated by the receiver 17 of the ground station side.

If the loop antenna 14 swings up or down due to vibrations of the mobile unit 11 as the mobile unit 11 is moved, then the distance between the loop antenna 14 and one of the parallel lines 12 and 13 is increased, while the distance between the loop antenna 14 and the other one of the parallel lines 12 and 13 is reduced. Consequently, the electromagnetic coupling between the loop antenna 14 and the one of the parallel lines 12 and 13 becomes weak, while the electromagnetic coupling between the loop antenna 14 and the other one of the parallel lines 12 and 13 becomes strong. Accordingly, one of the signal levels V1 and V2 of the parallel lines 12 and 13 is lowered, while the other thereof becomes high.

Since the signal levels V1 and V2 of the parallel lines 12 and 13 are added to each other when they are applied to the primary side of the level converting transformer 16, the total signal level (V1+ V2) is fluctuated small as compared with the case of using only one set of parallel lines.

According to the present invention, since the two sets of parallel lines parallel lines 12 and 13 are provided and the loop antenna 14 is located between the parallel lines 12 and 13, it is possible to prevent the lowering of the coupling level through electromagnetic coupling between the loop antenna 14 and the parallel lines 12 and 13 even if the loop antenna 14 swings up or down due to vibrations of the mobile unit 11 as the mobile unit 11 is moved.

While the loop antenna 14 is composed of the two loops, i.e., the loop antenna 14 has a double loop structure as described above, the present invention is not limited thereto and a loop antenna composed of only one loop, i.e., a single loop structure may be used. Also when a loop antenna of a single loop structure is used, effects similar to those achieved in the case of using a loop antenna of a double loop structure can be achieved against the vibrations of the mobile unit 11 as the mobile unit is moved.

When a loop antenna of a single loop structure is used, however, currents at a certain instant respectively flow in the same direction in the two sets of parallel lines 12 and 13. In view of this fact, in this case, the end portions 13c and 13d of the parallel lines 13 are connected to both ends of the primary winding 16b of the level converting transformer 16 not in a cross fashion but in a parallel fashion like the parallel lines 12 side. Accordingly, the respective signal levels V1 and V2 of the parallel lines 12 and 13 can be added to each other at the primary side of the transformer 16.

While the signal transmission means for transmitting signals from the parallel lines 12 and 13 to the ground station side is arranged in a manner that the respective signal levels V1 and V2 of the parallel lines 12 and 13 are added to each other by using the level converting transformer 16 so that the total signal level (V1+ V2) is transmitted to the ground station, the present invention is not limited thereto. For example, the signal transmission means may be arranged in a manner that the respective signal levels V1 and V2 of the parallel lines 12 and 13 are compared with each other by using a level comparator so as to select larger one of the signal levels V1 and V2 and the selected one of the signal levels is transmitted to the ground station side.

Figure 6:
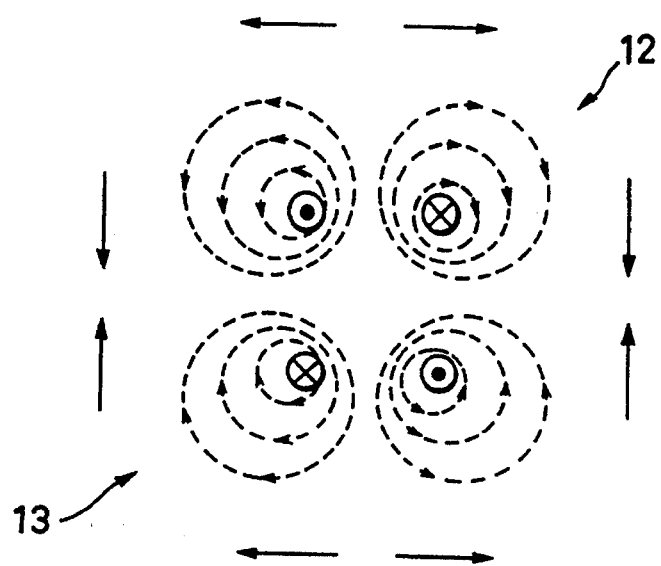
FIG. 6 is a cross-sectional view of the two sets of parallel lines used in the present invention and showing the state of magnetic field around the parallel lines.

FIG. 6 is a cross-sectional view of the parallel lines 12 and 13 in which the directions of current at a certain instant are represented by solid circles and crosses and the magnetic fields are represented by dotted lines.

Referring to FIG. 6, since the currents flow through the two sets of parallel lines 12 and 13 in the opposite direction to each other, when viewed from the outside of the parallel lines 12 and 13, the magnetic fields are respectively generated around the parallel lines due to the currents flowing in the respective parallel lines in such direction that the magnetic fields are canceled each other out as shown by the arrows in the sheet of drawing. Accordingly, the magnetic field radiated to the outside is weaken as compared with the case of using only one set of parallel lines.

According to the embodiment of the present invention, a loop antenna of a double loop structure is used as the loop antenna 14 such that, at a certain instant, the currents flow in the opposite direction in the respective loops of the loop antenna, whereby the direction of the respective currents flowing in the two sets of parallel lines 12 and 13 become opposite to each other at the certain instant. Accordingly, when viewed from the outside of the parallel lines 12 and 13, the magnetic fields are generated around the parallel lines due to the currents flowing in the respective parallel lines in such direction that the respective magnetic fields are canceled each other out. Therefore, the electric wave radiated to the outside from the parallel lines 12 and 13 can be reduced.

Further, such magnetic fields generated around the parallel lines act to cancel the changes of externally applied magnetic field, so that the system is less influenced by extraneous noise.

In the aforesaid embodiment, the present invention is applied to the inductive radio communication system in which the mobile unit 11 and the ground station are made to be a transmitter side and a receiver side respectively so that a signal is transmitted from the loop antenna 14 to the parallel lines 12 and 13 through electromagnetic coupling. However, the present invention is not limited thereto and may be applied to such an inductive radio communication system that the mobile unit 11 and the ground station are made to be a receiver side and a transmitter side respectively so that a signal is transmitted from the parallel lines 12 and 13 to the loop antenna 14 through electromagnetic coupling. Alternatively, the present invention may be applied to such an inductive radio communication system that the mobile unit 11 and the ground station are both able to transmit and receive a signal so that a signal is transmitted bidirectionally between the loop antenna 14 and the parallel lines 12 and 13 through electromagnetic coupling.

According to the present invention, as described above, two sets of parallel lines are provided along the track of a mobile unit and a loop antenna attached onto the mobile unit is located between the two sets of parallel lines. In such arrangement, even if the loop antenna comes away from one of the two sets of parallel lines when the loop antenna swings up or down due to vibrations of the mobile unit as the mobile unit is moved, the loop antenna approaches to the other set of parallel lines. Accordingly, the coupling level due to electromagnetic coupling becomes high on the other parallel lines side while it becomes low on the one parallel lines side. Consequently, when viewed from the two sets of parallel lines, it is possible to suppress the coupling level due to the vibrations of the mobile unit from being lowered.

According to the present invention, as described above, the loop antenna is arranged to have a double loop structure in a manner that the loop length is sufficiently shorter than the signal wave length and that the directions of the currents flowing through the respective loops of the loop antenna are opposite to each other at a certain instant. Consequently, the currents flow in the opposite direction to each other in the two sets of parallel lines at the certain instant. Thus, when viewed from the outside of two sets of the parallel lines, the magnetic fields are generated around the parallel lines due to the currents flowing in the respective parallel lines in such direction that the respective magnetic fields are canceled each other out. Therefore, the electric wave radiated to the outside from the parallel lines can be decreased and also the influence of extraneous noise can be made reduced.

According to the present invention, as described above, the signal levels transmitted from the loop antenna to the two sets of parallel lines through electromagnetic coupling are added and the total signal level is transmitted to the ground station when a signal is transmitted from the mobile unit to the ground station. Accordingly, a large signal level can be obtained from the parallel line side as compared with the case of using only one set of parallel lines.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An inductive radio communication system for transmitting/receiving a signal between a mobile unit and a ground station comprising:
   at least two sets of parallel lines separated from each other by a predetermined distance and installed along a track of said mobile unit;
   an antenna attached on said mobile unit and disposed between said parallel lines; and
   a signal transmission means for transmitting a signal between said ground station and said parallel lines.

2. An inductive radio communication system according to claim 1, wherein said antenna is formed of a loop antenna.

3. An inductive radio communication system according to claim 2, wherein said loop antenna has a loop length sufficiently shorter than a signal wave length and has a double loop structure so that currents flow in the respective loops in opposite directions to each other at a certain instant.

4. An inductive radio communication system according to claim 1, 2 or 3, wherein said signal transmission means transmits signals from said parallel lines to said ground station in a manner that levels of signals supplied from said parallel lines are added to each other.

* * * * *